United States Patent
Abiko

(10) Patent No.: US 8,358,870 B2
(45) Date of Patent: Jan. 22, 2013

(54) IMAGE READING APPARATUS AND METHOD FOR SUCCESSIVELY READING A PLURALITY OF PARTIAL IMAGES FROM A RELATIVELY MOVING OBJECT

(75) Inventor: Yukihiro Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 578 days.

(21) Appl. No.: 12/507,395

(22) Filed: Jul. 22, 2009

(65) Prior Publication Data

US 2009/0279742 A1 Nov. 12, 2009

Related U.S. Application Data

(63) Continuation of application No. PCT/JP2007/051105, filed on Jan. 24, 2007.

(51) Int. Cl.
G06K 9/36 (2006.01)

(52) U.S. Cl. ........ 382/284; 382/107; 382/124; 382/125; 382/294; 382/300

(58) Field of Classification Search .............. 382/107, 382/115, 124–126, 284, 293–295, 300
See application file for complete search history.

(56) References Cited

U.S. PATENT DOCUMENTS

| | | | |
|---|---|---|---|
| 4,698,843 A * | 10/1987 | Burt et al. | 382/275 |
| 5,999,662 A * | 12/1999 | Burt et al. | 382/284 |
| 6,289,114 B1 | 9/2001 | Mainguet | |
| 6,317,508 B1 | 11/2001 | Kramer et al. | |
| 6,459,804 B2 | 10/2002 | Mainguet | |
| 6,580,816 B2 | 6/2003 | Kramer et al. | |
| 6,898,240 B2 * | 5/2005 | Prakash et al. | 375/240.08 |
| 7,079,671 B2 | 7/2006 | Morihara et al. | |
| 7,231,077 B2 * | 6/2007 | Eck et al. | 382/132 |
| 7,565,548 B2 * | 7/2009 | Fiske et al. | 382/125 |
| 7,613,334 B2 * | 11/2009 | Morgeneier et al. | 382/124 |
| 7,616,787 B2 * | 11/2009 | Boshra | 382/124 |
| 2003/0161510 A1 | 8/2003 | Fujii | |
| 2003/0194114 A1 | 10/2003 | Mitsuyu et al. | |
| 2004/0052407 A1 | 3/2004 | Kawabe | |
| 2004/0114784 A1 | 6/2004 | Fujii | |
| 2004/0179747 A1 | 9/2004 | Matsumoto | |
| 2004/0228508 A1 | 11/2004 | Shigeta | |

(Continued)

FOREIGN PATENT DOCUMENTS

| | | |
|---|---|---|
| JP | 10-91769 A | 4/1998 |
| JP | 11-253428 A | 9/1999 |

(Continued)

OTHER PUBLICATIONS

International Preliminary Report on Patentability (Form PCT/IB/373) of International Application No. PCT/JP2007/051105 with form PCT/ISA/237.

(Continued)

*Primary Examiner* — Eric Rush
(74) *Attorney, Agent, or Firm* — Westerman, Hattori, Daniels & Adrian, LLP

(57) ABSTRACT

An image reading apparatus includes a fingerprint sensor that acquires a plurality of first images obtained by successively reading the portions of a relatively moving object, an extrapolation section that extrapolates the plurality of first images to generate a plurality of second images obtained by extending the image area of the first image, and a relative position detection section that calculates the relative position between the plurality of images or the plurality of second images based on a plurality of images including at least the plurality of first images or the plurality of second images.

13 Claims, 14 Drawing Sheets

U.S. PATENT DOCUMENTS

| | | |
|---|---|---|
| 2005/0100200 A1 | 5/2005 | Abiko et al. |
| 2006/0002596 A1 | 1/2006 | Takahashi |
| 2006/0285729 A1* | 12/2006 | Kim et al. .................... 382/124 |

FOREIGN PATENT DOCUMENTS

| | | | |
|---|---|---|---|
| JP | 2001155137 A * | 6/2001 | |
| JP | 2003-208620 A | 7/2003 | |
| JP | 2003-248820 A | 9/2003 | |
| JP | 2003-248828 A | 9/2003 | |
| JP | 2003-303338 A | 10/2003 | |
| JP | 2004-110438 A | 4/2004 | |
| JP | 2004-164170 A | 6/2004 | |
| JP | 2004-274573 A | 9/2004 | |
| JP | 2004-348726 A | 12/2004 | |
| JP | 2004-351039 A | 12/2004 | |
| JP | 2005-4718 A | 1/2005 | |
| JP | 2005-063020 A | 3/2005 | |
| JP | 2005-222472 A | 8/2005 | |
| JP | 2005-235157 A | 9/2005 | |
| JP | 2005-301746 A | 10/2005 | |
| JP | 2006-018436 A | 1/2006 | |
| JP | 2006-18754 A | 1/2006 | |
| JP | 2006-023899 A | 1/2006 | |
| WO | 2004-026139 A1 | 4/2004 | |

OTHER PUBLICATIONS

International Search Report mailed Feb. 20, 2007 in Corresponding International App No. PCT/JP2007/051105.

* cited by examiner

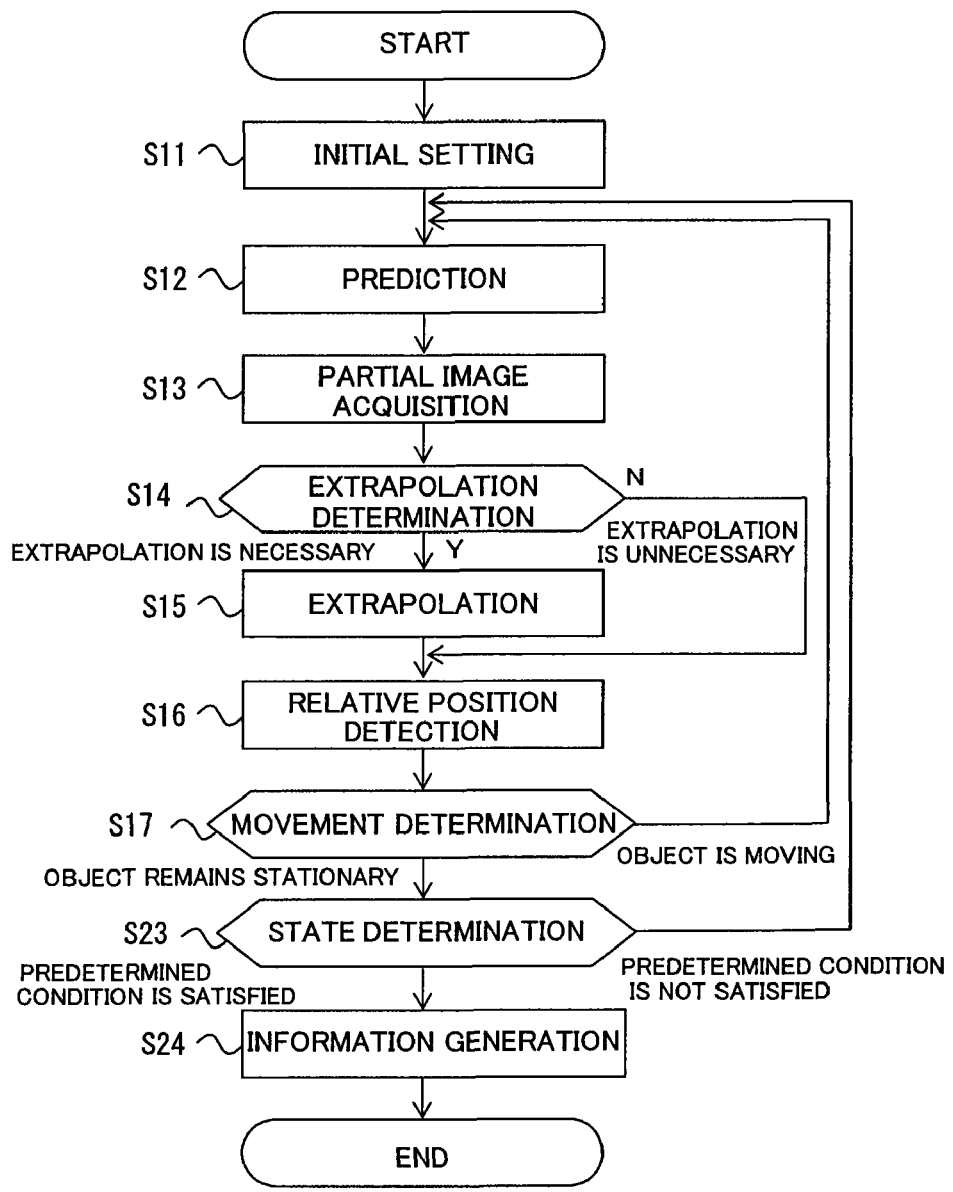

FIG 21

| |
|---|
| HEADER |
| INFORMATION OF 1ST PARTIAL IMAGE |
| INFORMATION OF 2ND PARTIAL IMAGE |
| |
| INFORMATION OF N-TH PARTIAL IMAGE |

FIG 22

| |
|---|
| DEVICE TYPE |
| IMAGE TYPE |
| RESOLUTION |
| QUANTIZATION LEVEL |
| NUMBER OF IMAGE INFORMATION |
| VERTICAL SIZE OF IMAGE |
| HORIZONTAL SIZE OF IMAGE |

FIG 23

| |
|---|
| VERTICAL MOVEMENT AMOUNT |
| HORIZONTAL MOVEMENT AMOUNT |
| TIME STAMP 1 (READ START TIME) |
| TIME STAMP 2 (READ END TIME) |
| SENSITIVITY SETTING |
| PRESENCE/ABSENCE OF EXTRAPOLATION |
| PARTIAL IMAGE |

IMAGE READING APPARATUS AND METHOD FOR SUCCESSIVELY READING A PLURALITY OF PARTIAL IMAGES FROM A RELATIVELY MOVING OBJECT

CROSS-REFERENCE TO RELATED APPLICATIONS

This application is a continuation application, filed under 35 U.S.C. §111(a), of PCT Application No. PCT/JP2007/051105, filed on Jan. 24, 2007, the disclosure of which is herein incorporated in its entirety by reference.

FIELD

The present invention relates to an image reading apparatus, an image reading program, and an image reading method that successively read a plurality of partial images from a relatively moving object.

BACKGROUND

Small information devices such as mobile phones and PDAs (Personal Digital Assistants) have become increasingly sophisticated in recent years and have become capable of communicating with a network or storing a large amount of personal information. Under such circumstances, a demand for improvement in the security performance in such devices is increasing significantly. In order to assure the security in such devices, personal authentication based on a password, an ID (Identification) card and so forth conventionally and commonly used can be adopted. However, the password and the ID card have a high degree of possibility of misappropriation. Therefore, it is much demanded to achieve personal authentication (authentication for certifying that a user of a device is the one registered in advance) having a high degree of reliability.

Personal authentication based on organism information (biometrics information) has a high degree of reliability. Therefore, it is considered that such personal authentication can satisfy the demand described above. Particularly, if a fingerprint is used as the organism information, not only the reliability but also the convenience is high.

If personal authentication is performed using a fingerprint as organism information, a capacitance type fingerprint sensor or an optical type fingerprint sensor is used to sample a fingerprint (a pattern formed from ridges which may contact with a sampling face of the fingerprint sensor and valley lines which do not contact with the sampling face) as image information from a finger of a person to be authenticated. Thereafter, characteristic information (e.g., position information of a bifurcation or an end point) is extracted from a foreground of the fingerprint image (e.g., a ridge image). Then, the extracted characteristic information and registration characteristic information of the person to be authenticated registered in advance are collated with each other. Thus, determination on whether or not the person to be authenticated is the original person, that is, the personal authentication is performed.

Incidentally, a general fingerprint sensor (hereinafter, sometimes referred to as "plane type fingerprint sensor") for sampling a fingerprint image from a person to be authenticated normally has a sensor face (sampling face) having a size greater than that of a finger. However, in recent years, in order to incorporate a fingerprint sensor into a small-size information device such as a mobile phone set and a PDA, such a method as described below is utilized. That is, the size of the sensor face is formed smaller than that of a finger and a plurality of partial images successively sampled through the sensor face are synthesized to obtain an image of the entire fingerprint.

As a fingerprint sensor which can deal with such a situation, a sweep type fingerprint sensor is available. The sweep type fingerprint sensor has a rectangular sampling face (sensor face/image pickup face) having a length and an area sufficiently smaller than those of a finger. When the sweep type fingerprint sensor is used, a plurality of partial images of a fingerprint are successively sampled by the fingerprint sensor while the finger is moved with respect to the sampling face (fingerprint sensor) is moved with respect to the finger. Then, the entire fingerprint image is reconstructed based on the plurality of sampled partial images. Then, information of a characteristic point (a bifurcation or an end point of a ridge) is extracted and produced from the reconstructed entire fingerprint image, and personal authentication is performed based on the extracted information. It is to be noted that, relative movement of a finger with respect to a sampling face is hereafter referred to as "sweep" or "slide". Further, there is known a technique in which a sweep type fingerprint sensor is used in a pointing device.

Patent Document 1: Japanese Laid-Open Patent Publication No. 10-091769
Patent Document 2: Japanese Laid-Open Patent Publication No. 2003-208620
Patent Document 3: Japanese Laid-Open Patent Publication No. 2006-107366
Patent Document 4: Japanese Laid-Open Patent Publication No. 2003-248820
Patent Document 5: Japanese Laid-Open Patent Publication No. 2001-307078

However, in the technique of the sweep type fingerprint sensor, an overlapping area between the partial images is essential in order to acquire information of the entire fingerprint from the partial images of a sampled fingerprint. Similarly, in the technique of the sweep type fingerprint sensor used in a pointing device, an overlapping area between the partial images is essential in order to measure the movement direction and orientation of a finger.

SUMMARY

According to an aspect of the invention, an image reading apparatus includes: an acquisition section that acquires a plurality of first images obtained by successively reading the portions of a relatively moving object; an extrapolation section that extrapolates the plurality of first images to generate a plurality of second images obtained by extending the image area of the first image; and a calculation section that calculates the relative position between the plurality of images or the plurality of second images based on a plurality of images including at least the plurality of first images or the plurality of second images.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a flowchart depicting an example of operation of the fingerprint reading apparatus according to the second embodiment;

FIG. 21 is a table depicting an example of a format of output information according to the second embodiment;

FIG. 22 is a table depicting an example of a format of a header section in the output information according to the second embodiment; and FIG. 23 is a table depicting an example of a format of partial image information in the output information according to the second embodiment.

DESCRIPTION OF EMBODIMENTS

Embodiments of the present invention will be descried below with reference to the accompanying drawings.

First Embodiment

In the present embodiment, a case where an image reading apparatus according to the present invention is applied to a fingerprint reading apparatus will be described. A fingerprint reading apparatus according to the present embodiment is configured to acquire a plurality of partial images (first images) of a fingerprint while a finger is moved and reconstruct the entire image of the fingerprint from the plurality of partial images for output. An object to be read may be organism information other than the fingerprint, such as a palm pattern, a finger vein pattern, or a palm vein pattern.

First, a configuration of the fingerprint reading apparatus according to the present embodiment will be described.

Figure 1:
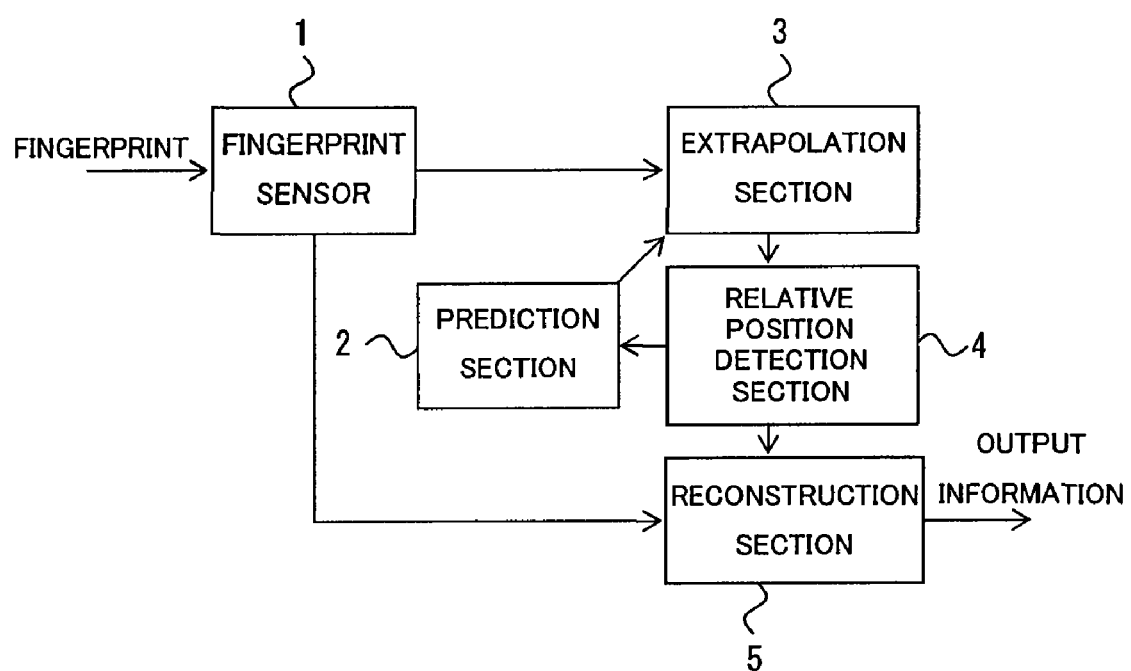
FIG. 1 is a block diagram depicting an example of a configuration of a fingerprint reading apparatus according to a first embodiment of the present invention.

FIG. 1 is a block diagram depicting an example of a configuration of the fingerprint reading apparatus according to the present embodiment. The fingerprint reading apparatus includes a fingerprint sensor 1 (acquisition section), a prediction section 2 (instruction section), an extrapolation section 3, a relative position detection section 4 (calculation section), and a reconstruction section 5 (synthesis section).

Next, operation of the fingerprint reading apparatus according to the present embodiment will be described.

Figure 2:
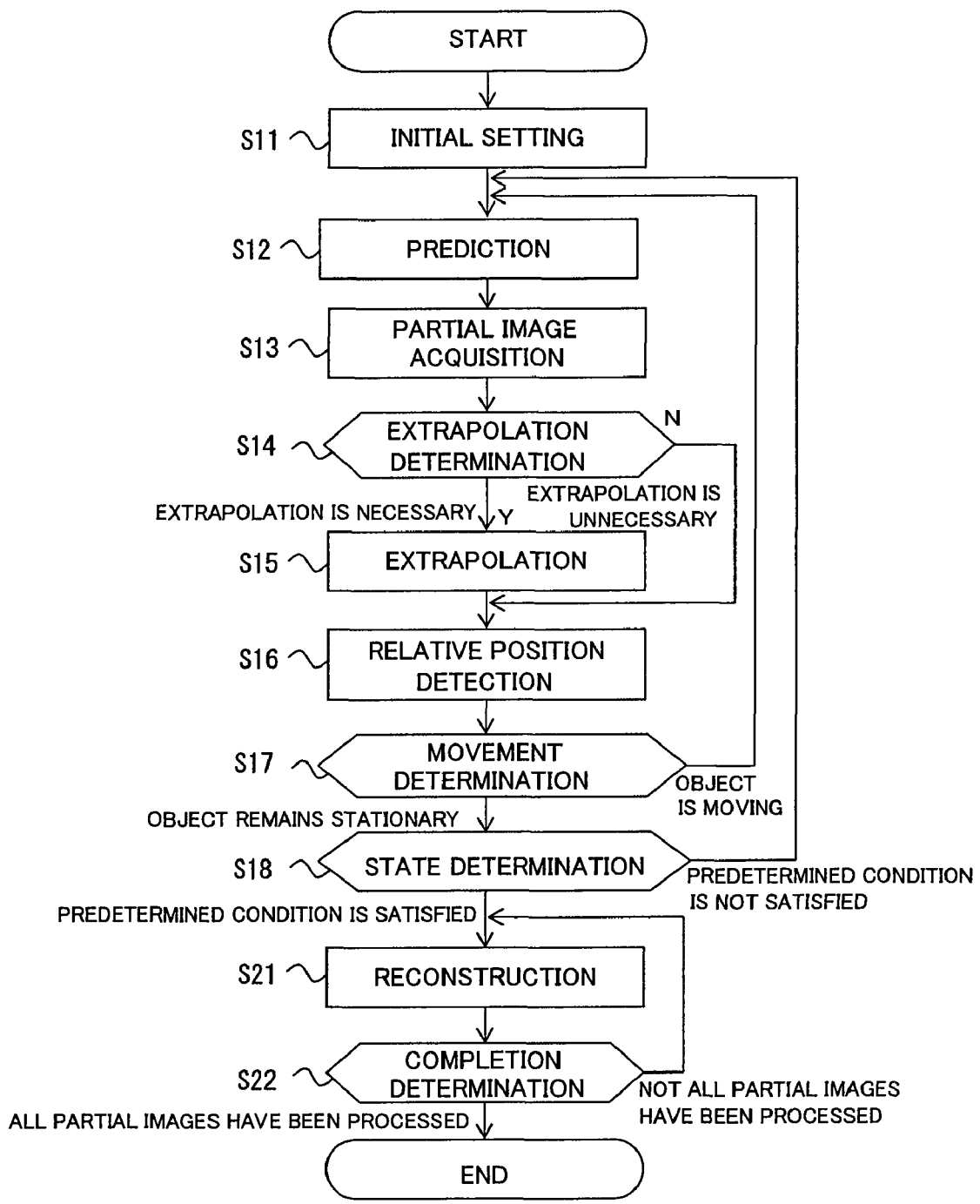
FIG. 2 is a flowchart depicting an example of operation of the fingerprint reading apparatus according to the first embodiment.

FIG. 2 is a flowchart depicting an example of operation of the fingerprint reading apparatus according to the present embodiment. First, each section described above performs initial setting (S11). Then, based on the relative position of a partial image that has previously been calculated, the prediction section 2 performs prediction of the relative position of a partial image to be acquired next (S12). However, if the relative positions of two or more of partial images have not yet been acquired, the prediction section 2 does not operate.

Then, the fingerprint sensor 1 performs partial image acquisition processing that acquires a partial image (S13: acquisition step). The prediction section 2 performs extrapolation determination processing that determines whether or not to perform extrapolation processing based on the position predicted in the prediction processing (S14). When it is determined to perform the extrapolation processing, (Yes in S14), the extrapolation section 3 performs the extrapolation processing based on the partial image to generate an extended image (second image) (S15: extrapolation step), and then the flow proceeds to the next step. When it is determined not to perform the extrapolation processing, (No in S14), the flow proceeds to a subsequent step. Then, the relative position detection section 4 performs relative position detection processing that detects the relative positions between the partial images or extended images based on the acquired partial images and extended images (S16: calculation step).

Pre-processing may be performed for the partial image acquisition step. The pre-processing for the partial image acquisition step includes, e.g., general noise reduction processing and characteristic compensation processing according to the device characteristics of the fingerprint sensor 1. Due to the device characteristics, an image may elastic distortion or skew distortion depending on the movement speed of a finger passing on the fingerprint sensor 1. In such a case, post-processing such as distortion correction processing may be applied after the relative position detection processing.

Then, the prediction section 2 determines whether the object (finger) is moving or not. When it is determined that the object is moving (S17: object is moving), the flow returns to step S12. When it is determined that the object remains stationary (S17: object remains stationary), the flow proceeds to the next step.

Then, the reconstruction section 5 determines whether a state obtained based on the relative positions satisfies a predetermined condition (S18). When it is determined that the obtained state does not satisfy a predetermined condition (S18: a predetermined condition is not satisfied), the flow returns to step S12. When it is determined that the obtained state satisfies a predetermined condition (S18: a predetermined condition is satisfied), the reconstruction section 5 performs reconstruction processing that synthesizes a plurality of partial images based on the relative positions of the partial images so as to generate the entire image of the fingerprint (S21) and then determines whether all the partial images have been processed (S22). When it is determined that not all the partial images have been processed (S22: not all partial images have been processed), the flow returns to step S21 where the reconstruction section 5 processes the next partial image. When it is determined that all the partial images have been processed (S22: all partial images have been processed), the reconstruction section 5 outputs the entire image as output information, and this flow is ended. Note that an instruction step in claims corresponds to steps S12 and S14.

The state that the reconstruction section 5 includes contact range of organism information, area thereof, average movement speed thereof, variation in movement speed thereof, movement direction thereof, variation in movement speed thereof, and the like. The reconstruction section 5 sets a threshold value for each of the above states as a predetermined condition in step S11. Further, the upper limit value may be set for the number of times of repetition of the procedures from step S12 to S16 in step S11. In this case, when the number of times of repetition exceeds the upper limit value, it can be determined that the organism is stopped in step S13, and the flow may shift to the next step.

Next, the fingerprint sensor 1 will be described.

The sweep type fingerprint sensor 1 is configured to visualize a fingerprint (organism information) of an object and intermittently detect a plurality of partial images from the fingerprint. More specifically, the fingerprint sensor 1 reads a finger (organism portion) relatively moving with respect to the fingerprint sensor 1 and intermittently acquires a plurality of two-dimensionally arrayed partial images.

The fingerprint sensor 1 may be a capacitance type sensor, thermal type sensor, electric-field type sensor, or an optical sensor. A fingerprint is formed on the outer surface of a skin of an object and is formed from ridge lines (contacting portions) which may contact with the sensor face and valley lines (non-contacting portions/void portions) which do not contact with the sensor face. The fingerprint sensor utilizes the fact that the detection sensitivity is different between the ridge portions which contact with the sensor face and the valley lines which do not contact with the sensor face to sample partial images of a fingerprint as a multilevel image. In the multilevel image obtained using a capacitance type fingerprint sensor or electric field type fingerprint sensor, the brightness varies depending on the distance from the sensor and, generally, the ridge portions whose distance from the sensor is smaller are displayed in low brightness and the valley line portions whose distance from the sensor is larger are displayed in high brightness.

Figure 3:
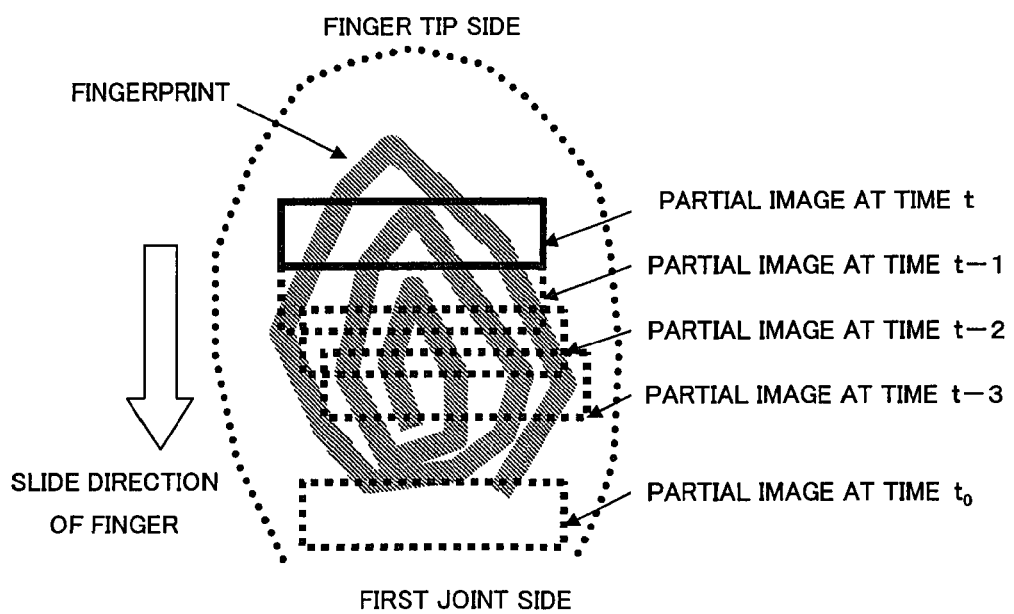
FIG. 3 is a plan view depicting an example of operation of the fingerprint sensor according to the first embodiment.

Upon reading of a fingerprint, a user moves, while touching the sensor face of the fingerprint sensor 1 with a finger thereof, the finger in an optional direction from the root side of the finger (first joint side) to the fingertip side, or from the right side to the left side of the finger. It is to be noted, however, where a mechanism for moving the fingerprint sensor with respect to a finger is provided, the user need not move a finger thereof. FIG. 3 is a plan view depicting an example of operation of the fingerprint sensor according to the present embodiment. In the present embodiment, as depicted in FIG. 3, a case where the user slidably moves a finger thereof on the sensor face from the first joint side to the fingertip side is be described. The fingerprint sensor 1 acquires partial images of respective positions at time t0, . . . t-3, t-2, t-1, and t.

Next, the relative position detection section 4 will be described.

The relative position detection section 4 is configured to detect the relative position of a finger with respect to the fingerprint sensor 1 (i.e., the relative movement distance of a finger) every time a single fingerprint partial image is sampled by the fingerprint sensor 1. In other words, the relative position is the position at which corresponding portions in the two partial images or extended images completely overlap with each other. Concretely, the relative position detection section 4 calculates dissimilarity using the sequential similarity detection method or calculates similarity using a cross-correlation method. In the sequential similarity detection method, a relative position at which the minimal value can be obtained is calculated, while in the cross-correlation method, a relative position at which the maximum value can be obtained is calculated.

First, the sequential similarity detection method will be described.

Figure 4:
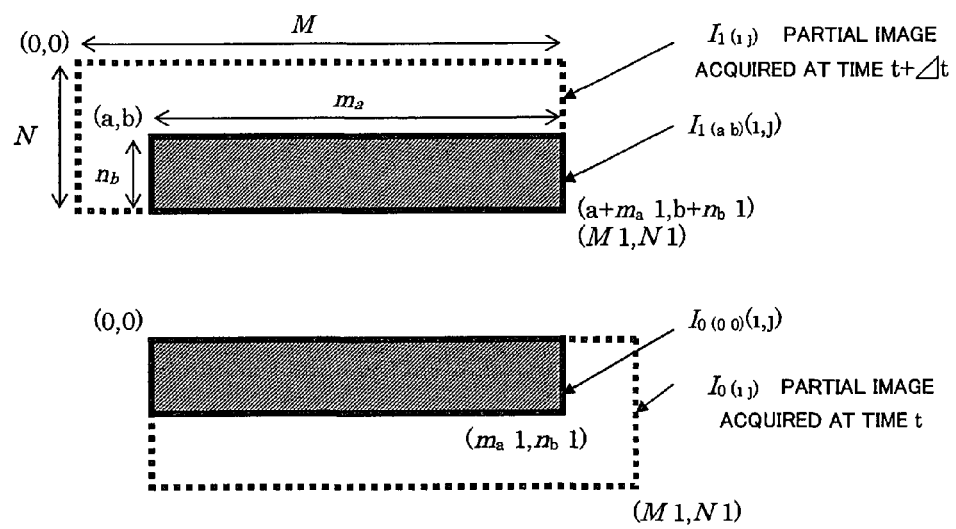
FIG. 4 is a view depicting an example of a partial image according to the first embodiment.

FIG. 4 is a view depicting an example of the partial image according to the present embodiment. As depicted in FIG. 4, a partial image $I_0$ (having a size of M×N pixels) acquired at time t and a partial image $I_1$ (having a size of M×N pixels) acquired at time t+Δt are used. Assuming that coordinates in the right and lower directions are i and j, the acquired images are represented as: partial image $I_0(i,j)$ and partial image $I_1(i,j)$, $0 \leq i < M$, $0 \leq j < N$. Further, an area of interest (overlapping portion) in the partial image $I_0(i,j)$ whose upper-left corner has a coordinate of (0,0) is represented as $I_{0(0,0)}$ (having a size of $m_a \times n_b$ pixels), and an area of interest (overlapping portion) in the partial image $I_1(i,j)$ whose upper-left corner has a coordinate of (a,b) is represented as $I_{1(a,b)}$ (having a size of $m_a \times n_b$ pixels). Further, the relative position (shift amount) of the partial image $I_1$ with respect to the partial image $I_0$ is represented by (a,b). The dissimilarity $R_{(a,b)}$ between the area of interest $I_{0(0,0)}$ and area of interest $I_{1(a,b)}$ is calculated using the following equations.

$$R_{(a,b)} = \Sigma\Sigma |I_{1(a,b)}(i,j) - I_{0(0,0)}(i,j)|/(m_a \times n_b), \text{ where } a<0 \text{ and } b<0$$

$$R_{(a,b)} = \Sigma\Sigma |I_{1(0,b)}(i,j) - I_{0(a,0)}(i,j)|/(m_a \times n_b), \text{ where } a \geq 0 \text{ and } b<0$$

$$R_{(a,b)} = \Sigma\Sigma |I_{1(a,0)}(i,j) - I_{0(0,b)}(i,j)|/(m_a \times n_b), \text{ where } a<0 \text{ and } b \geq 0$$

$$R_{(a,b)} = \Sigma\Sigma |I_{1(0,0)}(i,j) - I_{0(a,b)}(i,j)|/(m_a \times n_b), \text{ where } a \geq 0 \text{ and } b \geq 0$$

In the above equations, i satisfies $0 \leq i < m_a$, j satisfies $0 \leq j < n_b$, and $I_{k(i,j)}$ represents a brightness value. $\Sigma$ represents the summation operation of i and j in the abovementioned ranges. In the case where the slide direction can be limited within a predetermined range, any one or more of the four equations can be selected. Further, values of a and b may be limited within a predetermined range. Further, the boundary condition and the like between a and b may be changed within the predetermined value range. Anyway, the relative position detection section 4 outputs a relative position (a,b) at which the dissimilarity $R_{(a,b)}$ becomes a minimum value $R_{min(a,b)}$.

Next, the cross-correlation method will be described.

As in the case of the sequential similarity detection method, the partial image $I_0$, partial image $I_1$, area of interest (overlapping portion)$I_{0(0,0)}$, and area of interest (overlapping portion) $I_{1(a,b)}$ are used. In the cross-correlation method, the similarity $R_{(a,b)}$ between the area of interest $I_{0(0,0)}$, and area of interest $I_{1(a,b)}$ is calculated using the following equations.

$$R_{(a,b)} = \Sigma\Sigma\{I_{1(a,b)}(i,j) - E(I_{1(a,b)})\}\{I_{0(0,0)}(i,j) - E(I_{0(0,0)})\}/\sqrt{(V(I_{1(a,b)}) \times V(I_{0(0,0)}))}, \text{ where } a<0 \text{ and } b<0$$

$$R_{(a,b)} = \Sigma\Sigma\{I_{1(0,b)}(i,j) - E(I_{1(0,b)})\}\{I_{0(a,0)}(i,j) - E(I_{0(a,0)})\}/\sqrt{(V(I_{1(0,b)}) \times V(I_{0(a,0)}))}, \text{ where } a \geq 0 \text{ and } b<0$$

$$R_{(a,b)} = \Sigma\Sigma\{I_{1(a,0)}(i,j) - E(I_{1(a,0)})\}\{I_{0(0,b)}(i,j) - E(I_{0(0,b)})\}/\sqrt{(V(I_{1(a,0)}) \times V(I_{0(0,b)}))}, \text{ where } a<0 \text{ and } b \geqq 0$$

$$R_{(a,b)} = \Sigma\Sigma\{I_{1(0,0)}(i,j) - E(I_{1(0,0)})\}\{I_{0(a,b)}(i,j) - E(I_{0(a,b)})\}/\sqrt{(V(I_{1(0,0)}) \times V(I_{0(a,b)}))}, \text{ where } a \geqq 0 \text{ and } b \geqq 0$$

In the above equation, $E(I_k) = \Sigma\Sigma I_k(i,j)/(m_a \times n_b)$ and $V(I_k) = \Sigma\Sigma\{I_k(i,j) - E(I_k)\}^2$ are satisfied.

The respective symbols each have the same as in the case of the sequential similarity detection method. In the case where the slide direction can be limited within a predetermined range, any one or more of the four equations can be selected. Further, values of a and b may be limited within a predetermined range. Further, the boundary condition and the like between a and b may be changed within the predetermined value range. Anyway, the relative position detection section 4 outputs a relative position (a,b) at which the similarity $R_{(a,b)}$ becomes a maximum value $R_{max(a,b)}$.

In the case where the sensitivity of the fingerprint sensor 1 needs to be kept constant or where the partial image has less noise, the sequential similarity detection method having a small amount of calculation advantageous. On the other hand, in the case where the sensitivity of the fingerprint sensor 1 is subject to change or where noise is easily introduced into the partial image, the cross-correlation method having a large amount of calculation but having less influence of noise is advantageous. As described above, the calculation method of the relative position may appropriately be selected depending on the characteristics of the fingerprint sensor 1 or usage thereof.

Next, the extrapolation section 3 will be described.

Figure 5:
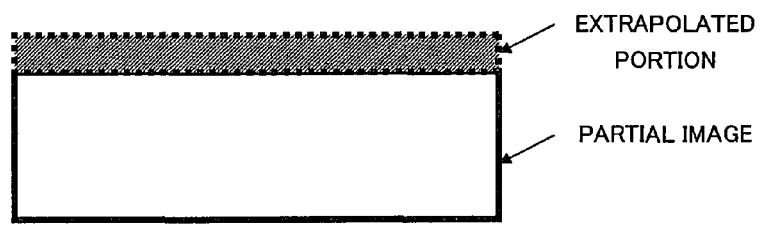
FIG. 5 is a conceptual view depicting an example of an extrapolated portion according to the first embodiment.

The extrapolation section 3 performs the extrapolation processing based on the partial image output from the fingerprint sensor 1 to extend the partial image to the area outside the image area (detection area) thereof. FIG. 5 is a conceptual view depicting an example of an extrapolated portion according to the present embodiment. The extrapolation means estimating, based on information of the partial image (denoted by a solid line frame in FIG. 5) output from the finger sensor 1, a portion to be extrapolated (denoted by a broken line frame) outside the partial image and adding the extrapolated portion to the partial image so as to generate an extended image which is an image obtained by extending the image area of the partial image. The extrapolation section 3 performs the extrapolation to the image extension area specified by the prediction section 2.

Figure 6:
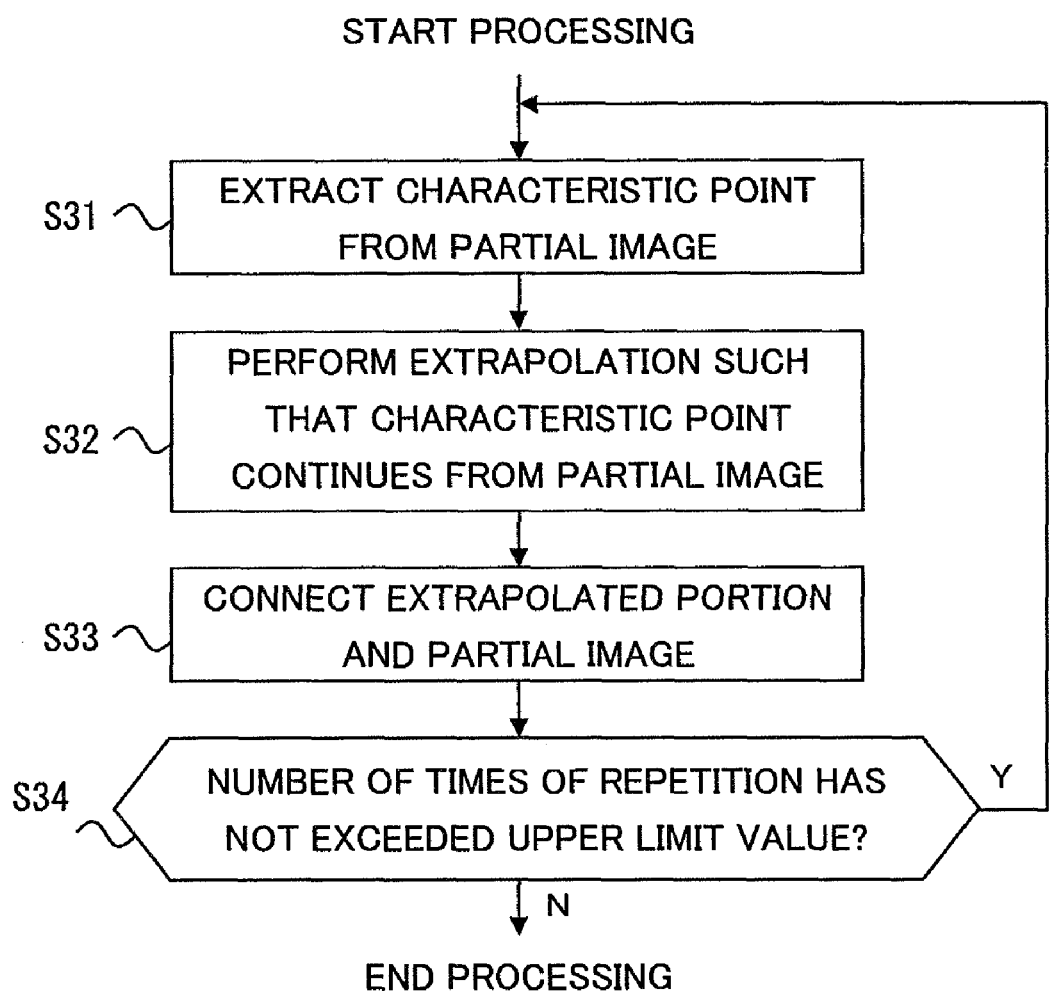
FIG. 6 is a flowchart depicting an example of operation of the extrapolation processing according to the first embodiment.

FIG. 6 is a flowchart depicting an example of operation of the extrapolation processing according to the present embodiment. The extrapolation section 3 extracts a characteristic point of the organism portion from the partial image (S31). Then, the extrapolation section 3 performs the extrapolation such that the characteristic point continues from the partial image (S32) and connects the partial image and extrapolated portion to generate an extended image (S33). When it is determined that the number of times of repetition has not exceeded a predetermined upper limit value (Yes in S34), the extrapolation section 3 performs the processing from steps S31 to S33 not for the partial image but for the extended image so as to extend the extrapolation portion. When it is determined that the number of times of repetition has exceeded a predetermined upper limit value (No in S34), this flow is ended. The upper value of the number of times of repetition depends on the allowable width of a gap between the partial images. Further, the allowable width depends on False Rejection Rate and False Acceptance Rate in the personal authentication using output information of the fingerprint reading apparatus.

Basically, an area (one line) corresponding to one pixel is extrapolated per one extrapolation. An area (two or more lines) corresponding to two or more pixels may be extrapolated without abruptly increasing the number of errors in the relative position detection section 4 or without degrading authentication performance, such as False Rejection Rate and False Acceptance Rate, in the personal authentication using output information of the fingerprint reading apparatus.

Continuity of various information, to be more specific, continuity of characteristic that an organism portion has can be used for the extrapolation. An example of the characteristic includes, e.g., brightness information, edge information, skeleton line (thin line) information, and frequency or phase information. In the present embodiment, a variation of the brightness in the sweep direction or along a reference axis is used. The reference axis generally indicates the short-axis direction of the sensor face in a typical sweep type fingerprint sensor. Although depending on the characteristics of the fingerprint sensor 1, the variation of the brightness generally continues in the short-axis direction.

In the case where the organism information is a fingerprint, by utilizing a fact that the fingerprint pattern is constituted by ridge lines and valley lines, it is possible to utilize the shape of an edge separating the ridge line and valley line. It is because that, in view of the characteristics of the fingerprint sensor, the valley line is output with a high brightness in a sensor configured to output the ridge line with a low brightness, while the valley line is output with a low brightness in a sensor configured to output the ridge line with a high brightness and, in each case, the brightness varies in a continuous manner. As a calculation method of the edge, a profile line of a digitized ridge line can be regarded as the edge. When this calculation method is adopted, the amount of calculation can be reduced, so that calculation load can effectively be reduced in a device having relatively low CPU performance, such as a mobile phone or a PDA (Personal Digital Assistance). As the digitization method, a known method such as a threshold method, a floating threshold method, or a p-tile method can be used. In place of the edge line, a characteristic line of the primary differentiation in two-dimensional distribution or continuity of zero-cross points of the secondary differentiation in two-dimensional distribution may be adopted.

Further, in the case of the organism information is a fingerprint, the shape of a skeleton line or shape of a thin line of the ridge line or valley line can be utilized. The skeleton line may be a pattern obtained by edge line tracking processing or a pattern obtained by tracking a point at equal distances from both end edges. The thin line is obtained as a pattern obtained by repeatedly applying degeneracy processing to a digitized fingerprint image to the utmost limit.

Since not a pixel-level fine shape but a comprehensive flow of the ridge line or valley line is important in order to estimate the portion to be extrapolated based on the edge direction, or skeleton line or thin line direction, direction data is calculated using a plurality of points. Concretely, a linear regression or the like is performed on the coordinates of the characteristic points to calculate the slope.

The organism information varies every second and differs greatly in individuals. Further, the sensitivity to the organism information differs depending on the type of the fingerprint sensor 1. Therefore, although previous learning may be appropriate, it is preferable to use an adaptive method capable of correct parameters required for the extrapolation while detecting the organism information. An example of the adaptive method includes a linear prediction method and a Bayesian prediction method. The Bayesian prediction method is a method of calculating a conditional probability based on observation values. Assuming that two events X and Y are independent events, a conditional probability P is a probability that the event X will occur given the knowledge that the event Y has already occurred. This conditional probability P can be represented by the following equation.

$$P(X|Y)=P(Y|X)P(X)/P(Y)$$

For example, the periodicity of a fingerprint pattern is utilized to calculate the conditional probability P(X|Y). In this case, attention is focused on a characteristic portion of the fingerprint pattern that exhibits periodicity, such as a portion where the brightness increases from the ridge line or a portion where the brightness decreases from the valley line. However, a large amount of data is required for prediction in this method and, therefore, matrix operation involving relatively long processing time needs to be performed. Thus, prediction is made by applying a polynomial function to the brightness or edge direction (skeleton line direction or thin line direction). It is said that the higher the polynomial degree, the more unstable the prediction using the polynomial function, which may result in an increase in error of the extrapolated portion. In view of this, one-degree polynomial or two-degree polynomial is used. In this polynomial application operation, a least squares method can be used.

Next, edge direction detection processing that detects edge direction as the characteristic of step S31 will be described.

Figure 7:
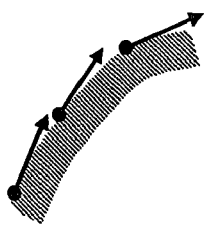
FIG. 7 is a conceptual view depicting an example of the edge direction in a low-resolution image.
Figure 8:
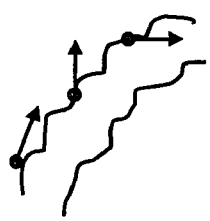
FIG. 8 is a conceptual view depicting an example of the edge direction in a high-resolution image.

The edge direction indicates the tangential direction of the profile of the ridge line. More particularly, the edge direction may be the tangential direction of a border line between the ridge line and the valley line, or direction along the edge portion of the ridge line. FIG. 7 is a conceptual view depicting an example of the edge direction in a low-resolution image. Conceptually, as depicted in FIG. 7, the ridge line can be regarded as a smooth curve having a certain width. FIG. 8 is a conceptual view depicting an example of the edge direction in a high-resolution image. In the case where a fingerprint sensor 1 having a resolution higher than about 500 dpi is used, it is possible to confirm that the edge is slightly undulated.

Figure 9:
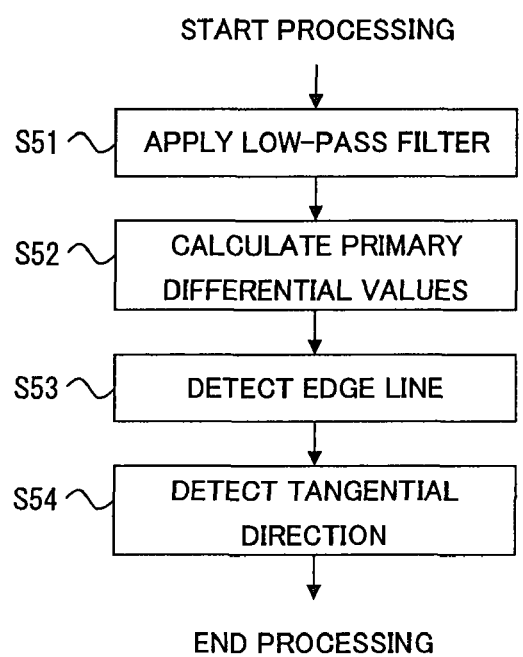
FIG. 9 is a flowchart depicting an example of operation of the edge direction detection processing according to the first embodiment.

The edge direction detection processing will be described. FIG. 9 is a flowchart depicting an example of operation of the edge direction detection processing according to the present embodiment. The extrapolation section 3 applies low-pass filter to the detected edge image (S51), creates a map of primary differential values (S52), detects an edge line connecting the maximum values of the primary differentiation as an edge (S53), sets the tangential direction of the detected edge as the edge direction (S54), and this flow is ended. Another procedure may be adopted in which the extrapolation section 3 creates a map of secondary differential values, detects inflection points of an original image from the secondary differential values, and sets the tangential direction of each inflection point as the edge direction.

In this case, the extrapolation section 3 performs the extrapolation in step S32 so as to extend an edge in the edge direction at the periphery of the partial image or extended image.

In the case where the edge is used as the organism information, the extrapolation section 3 extrapolates pixels sandwiched between the adjacent edges such that the pixels do not cross the edges. This reduces artifact caused due to general one-dimensional or two-dimensional extrapolation, thereby reducing the error of the relative position detected by the relative position detection section 4. At this time, the extrapolation section 3 extrapolates pixels in the vicinity of the edge along the direction of the extrapolated edge. This reduces artifact caused due to extrapolation error as compared to a case where the brightness gradient in the vicinity of the edge is gentler, thereby reducing the error of the relative position detected by the relative position detection section 4.

Next, skeleton line direction detection processing that detects the skeleton line direction as the characteristic of step S31 will be described.

Figure 10:
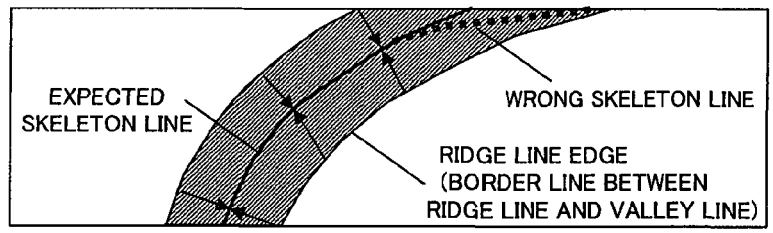
FIG. 10 is a conceptual view depicting an example of a skeleton line according to the first embodiment.

In the present embodiment, the skeleton line is defined as a line obtained by thinning the width of a ridge line to one-pixel width. FIG. 10 is a conceptual view depicting an example of the skeleton line according to the present embodiment. Concretely, when there exist edges to be paired with each other, a line at equal distances from both the edges is the skeleton line. It should be noted that a case may occur where detection of the skeleton line is influenced by the side of the partial image in the vicinity of an area where the side of the partial image and ridge line cross each other. That is, in the case where an edge exists in an area where the side of the partial image and ridge line cross each other, a wrong skeleton line which is different from an expected skeleton line may be detected in the area sandwiched between the border lines and side of the partial image as indicated by the dotted line depicted in FIG. 10. Therefore, it is important to detect the skeleton line without the influence of the side of the partial image.

Figure 11:
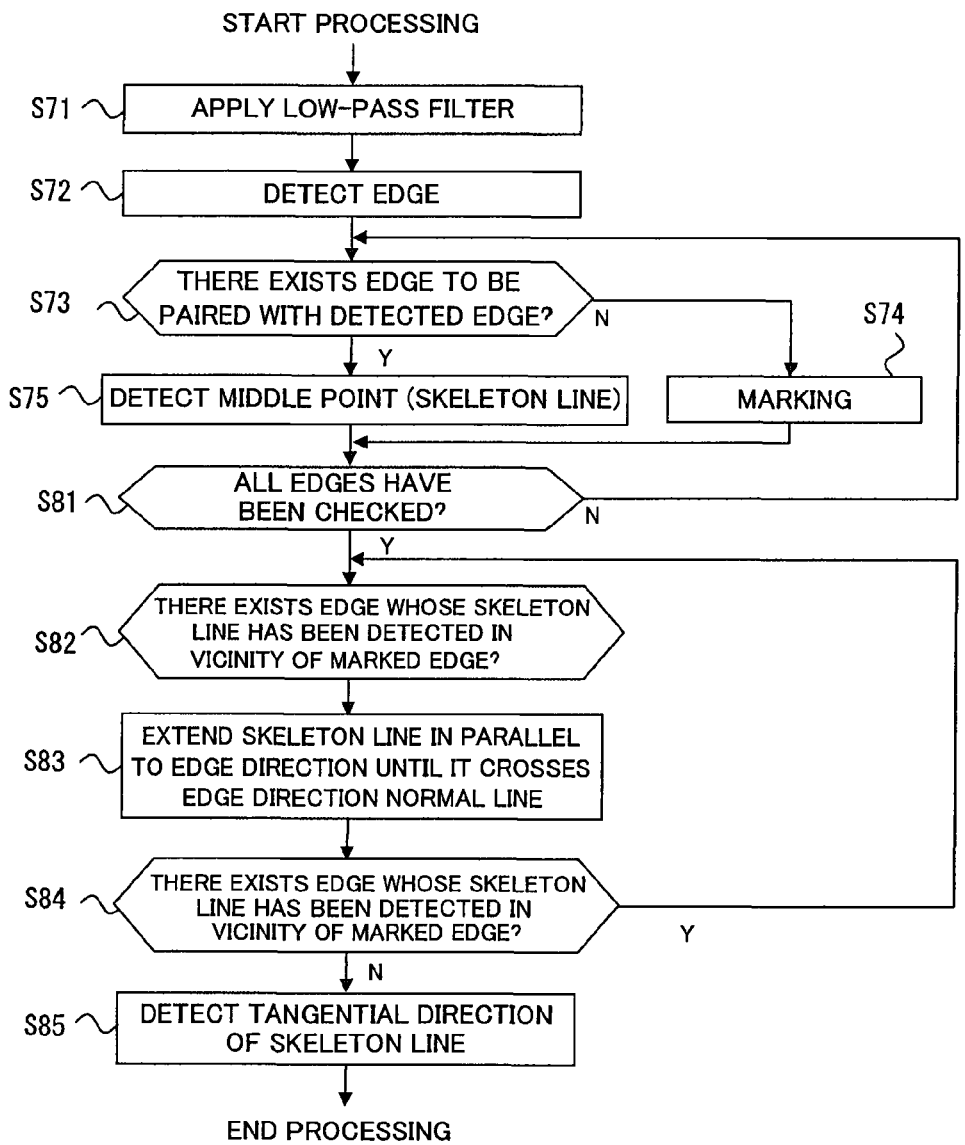
FIG. 11 is a flowchart depicting an example of the skeleton line detection processing according to the first embodiment.

The skeleton line direction detection processing will be described. FIG. 11 is a flowchart depicting an example of operation of the skeleton line detection processing according to the present embodiment. The extrapolation section 3 applies low-pass filter to the partial image (S71), detects an edge according to the processing of steps S52 and S53 (S72), and determines whether there exists an edge to be paired with the detected edge (S73). When it is determined that there is no edge to be paired to the detected edge (No in S37), the extrapolation section 3 marks the edge (S74), and the flow proceeds to the next step. When it is determined that there exists an edge to be paired with the detected edge (Yes in S73), the extrapolation section 3 detects a middle point (=skeleton line) (S75), and the flow proceeds to the next step. Then, the extrapolation section 3 determines whether all the edges have been checked. When it is determined that not all the edges have been checked (No in S81), the flow returns to step S73 and the extrapolation section 3 applies the processing to the next edge. When it is determined that all the edges have been checked (Yes in S81), the flow proceeds to the next step.

Then, the extrapolation section 3 detects the edge whose skeleton line has been detected in the vicinity of the marked edge (S82) and extends the skeleton line in parallel to the edge direction until it crosses the edge direction normal line (S83). The extrapolation section 3 determines whether there exists an edge whose skeleton line has been detected in the vicinity of the marked edge. When it is determined that the edge exists (Yes in S84), the flow returns to step S82. When it is determined that the edge does not exist (No in S84), the extrapolation section 3 detects the tangential direction of the skeleton line (S85), and this flow is ended.

In this case, the extrapolation section 3 performs the extrapolation in step S32 so as to extend the skeleton line in the skeleton line direction at the periphery of the partial image or extended image.

The extrapolation may be performed using both the edge and skeleton line.

Next, extrapolation processing using frequency information which is information of the frequency region of the partial image will be described.

Figure 12:
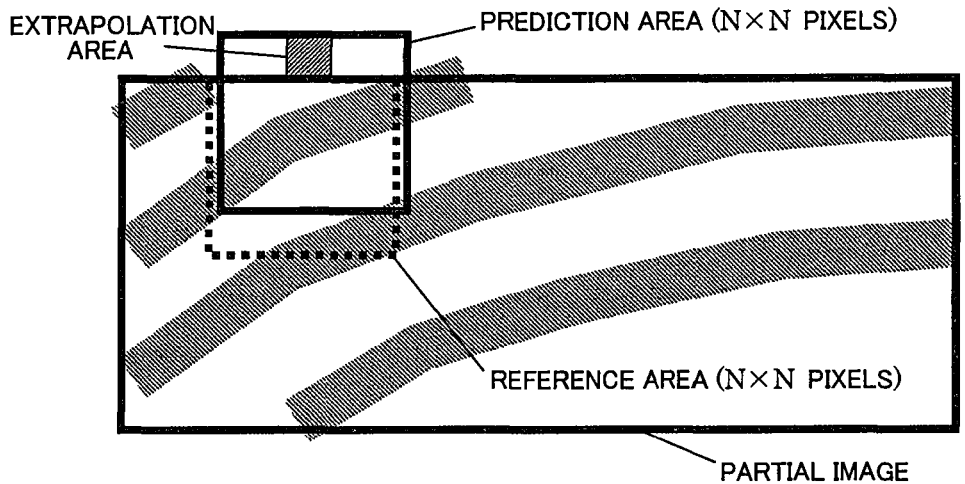
FIG. 12 is a conceptual view depicting an example of the extrapolation processing using frequency information according to the first embodiment.

FIG. 12 is a conceptual view depicting an example of the extrapolation processing using frequency information according to the present embodiment. As depicted in FIG. 12, a reference area (area surrounded by a broken line in FIG. 12)

is set in the partial image in order to obtain an extrapolation area (shaded area). The reference area has a size of N×N pixels (N is 2 n (n=0, 1, 2, . . . )). At the same time, a prediction area (area surrounded by a solid line) having the same size as that of the reference area is set so as to surround the extrapolation area. The positional difference, i.e., phase difference between the prediction area and the reference area is known information, so that by reflecting the phase difference in the frequency information calculated using Fourier transform, it is possible to predict the reference area. Since the Fourier transform is an orthogonal transform, so that in the case where the reference area is set in a two-dimensional field, one-dimensional Fourier transform may be applied in the horizontal direction and then in the vertical direction.

Figure 13:
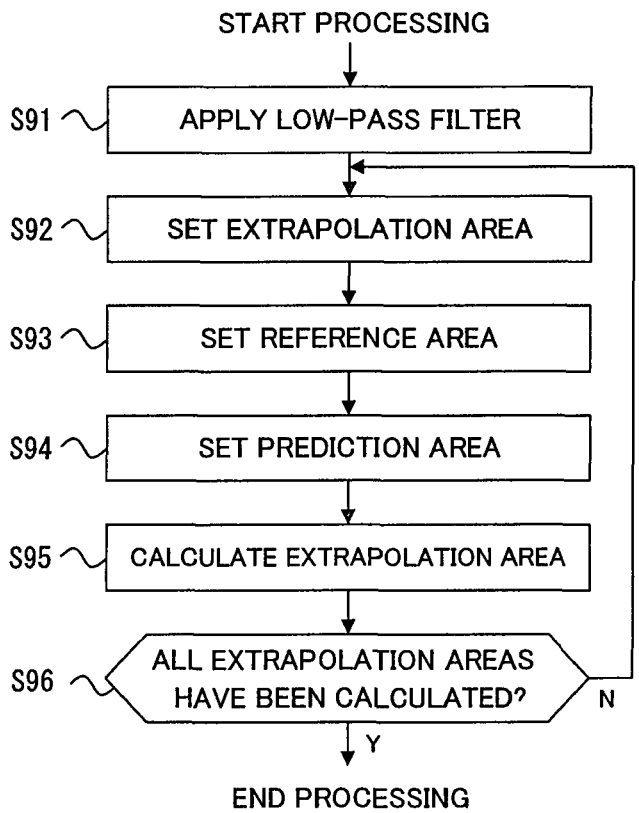
FIG. 13 is a flowchart depicting an example of operation of the extrapolation processing using frequency information according to the first embodiment.

FIG. 13 is a flowchart depicting an example of operation of the extrapolation processing using frequency information according to the present embodiment. The extrapolation section 3 applies low-pass filter to the partial image (S91). The extrapolation section 3 then sets the extrapolation area in the resultant partial image (S92), sets the reference area (S93), sets the prediction area (S94), and calculates the extrapolation area (S95). The extrapolation section 3 then determines whether all the extrapolation areas have been calculated. When it is determined that not all the extrapolation areas have been calculated (No in S96), the flow returns to step S92 and the extrapolation section 3 applies the processing to the next extrapolation area. When it is determined that all the extrapolation areas have been calculated (Yes in S96), the extrapolation section 3 ends this flow. The extrapolation section 3 acquires frequency information obtained by transforming the partial image into a frequency region using Fourier transform. The acquired frequency information has an amplitude and a phase. For example, fast Fourier transform is useful since it has a relatively low processing load.

That is, the extrapolation section 3 repeats the extrapolation area calculation processing for the entire range to be extrapolated while shifting the position of the extrapolation area. At this time, by setting the width of the extrapolation area equal to that of the reference area and setting the extrapolation area in the range that does not overlap the reference area, the amount of calculation can be reduced. In this case, however, the brightness may vary in a discontinuous manner at the boundary portion between the adjacent extrapolation areas. Thus, as depicted in this example, the width of the extrapolation area is set to ¼ (or ½) of that of the reference area, and reference areas of the respective adjacent extrapolation areas are made to overlap each other. As a result, it is possible to reduce the discontinuity in the brightness variation at the boundary portion between the adjacent extrapolation areas. Further, since the periodicity of the partial image is used, not just one line but a predetermined number of lines can be extrapolated at a time in the extrapolation processing using the frequency information.

Next, error caused by the extrapolation processing will be described.

Figure 14:
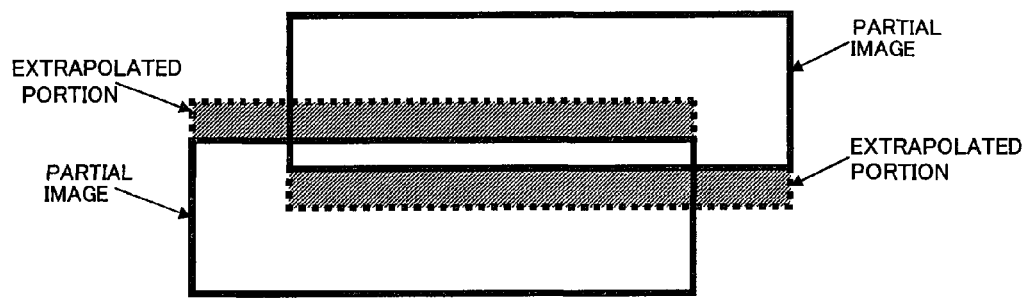
FIG. 14 is a conceptual view depicting an example of the first case according to the first embodiment.
Figure 15:
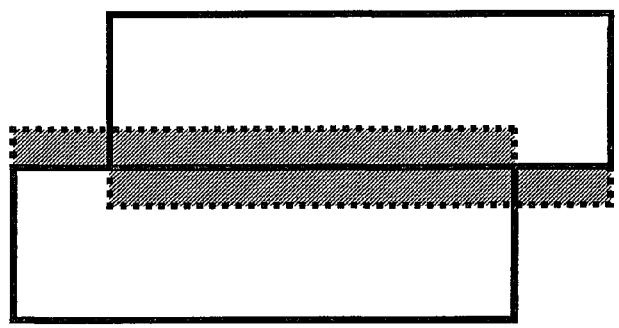
FIG. 15 is a conceptual view depicting an example of the second case according to the first embodiment.
Figure 16:
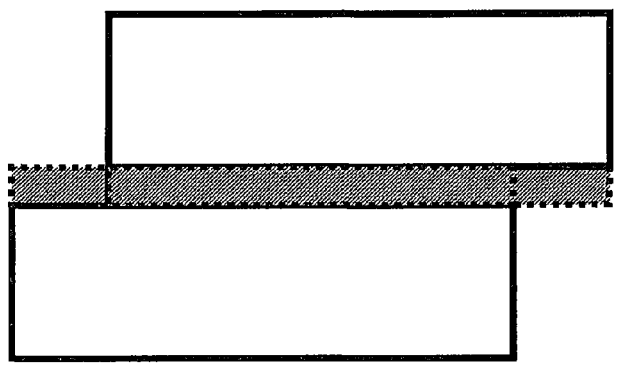
FIG. 16 is a conceptual view depicting an example of the third case according to the first embodiment.

The dissimilarity or similarity calculated by the relative position detection section 4 is subject to error due to the extrapolation in the extrapolated portion. The following three cases can be considered as the positional relationship between the two partial images (first partial image and second partial image). FIG. 14 is a conceptual view depicting an example of the first case according to the present embodiment. FIG. 15 is a conceptual view depicting an example of the second case according to the present embodiment. FIG. 16 is a conceptual view depicting an example of the third case according to the present embodiment. In each of FIGS. 14, 15, and 16, an area surrounded by a solid line is the partial image, and an area (shaded area) surrounded by a broken line is the extrapolated portion. The first case is a case where the first partial image and the second partial image overlap each other. The second case is a case where the first partial image and extrapolated portion of the second partial image overlap each other. The third case is a case where the extrapolated portion of the first partial image and extrapolated portion of the second partial image overlap each other. It was not possible for a conventional technique to detect the positional relationship between the partial images of only the first case.

When the dissimilarity or similarity is calculated for the above three cases under the same condition, a false result may occur due to influence of error of the extrapolated portion. Thus, the degree that the extrapolated portion contributes to the dissimilarity or similarity may be reduced. For example, the dissimilarity can be calculated by the following equation.

$$R_{(a,b)} = \{W_0 R_{0(a,b)} + W_1 R_{1(a,b)} + W_2 R_{2(a,b)}\}/(c\Sigma W_k)$$

In the above equation, $W_k$ is coefficient, and $R_{k(a,b)}$ is the local dissimilarity when the relative position is (a,b). k=0 indicates a case where both $I_0$ and $I_1$ are partial images. k=1 indicates a case where $I_0$ is a partial image and $I_1$ is an extrapolated portion, or vice versa, where $W_1 > W_0$. k=2 indicates a case where both $I_0$ and $I_1$ are extrapolated portions, where $W_2 > W_1$. c is constant.

The local dissimilarity can be calculated using the above-mentioned sequential similarity detection method.

The similarity can be calculated by the following equation.

$$R_{(a,b)} = \{W_0 R_{0(a,b)} + W_1 R_{1(a,b)} + W_2 R_{2(a,b)}\}/(c\Sigma W_k)$$

In the above equation, $W_k$ is coefficient, and $R_{k(a,b)}$ is the local dissimilarity when the relative position is (a,b). k=0 indicates a case where both $I_0$ and $I_1$ are partial images. k=1 indicates a case where $I_0$ is a partial image and $I_1$ is an extrapolated portion, or vice versa, where $W_1 < W_0$. k=2 indicates a case where both $I_0$ and $I_1$ are extrapolated portions, where $W_2 < W_1$. c is constant.

The local similarity can be calculated using the above-mentioned cross-correlation method.

As described above, in the case where a finger moves at a high speed on the fingerprint sensor 1, or where contamination is present on the end portion of the fingerprint sensor 1, the extrapolated section 3 enlarges the area where the relative position detection section 4 can detect the relative position to reduce read error rate, thereby improving usability.

Further, the extrapolation section 3 uses not only a general one-dimensional or two-dimensional extrapolation method but also edge information as the characteristic of the organism information. This reduces artifact caused due to extrapolation error, thereby reducing the error of the relative position detected by the relative position detection section 4. Similarly, the extrapolation section 3 uses the skeleton line or thin line, which reduces artifact caused due to extrapolation error, thereby reducing the error of the relative position detected by the relative position detection section 4. Further, the extrapolation section 3 uses the frequency information, which reduces artifact caused due to extrapolation error, thereby reducing the error of the relative position detected by the relative position detection section 4. Further, the extrapolation section 3 repeats the extrapolation processing to thereby enlarge the area of the portion to be extrapolated, allowing the relative position detection section 4 to detect the relative position even when an organism portion moves at high speed or when a lack of large area occurs due to wide-spread contamination, thereby improving usability.

Next, the prediction section 2 will be described.

The prediction section 2 limits a portion that the extrapolation section 3 extrapolates based on the relative position that has previously been calculated by the relative position detection section 4, thereby reducing the time required for the extrapolation processing. In the case where relative position $r_{t+\Delta t}(i,j)$ is calculated from a partial image sampled at time t and partial image sampled at time t+Δt, if the condition that Δt is sufficiently small is satisfied, it is possible to consider that $r_{t+\Delta t}(i,j)$ does not significantly deviate from the relative position $r_{t(i,j)}$ detected from the partial image sampled at time t−Δt and partial image sampled at time t, according to the law of inertia.

Figure 17:
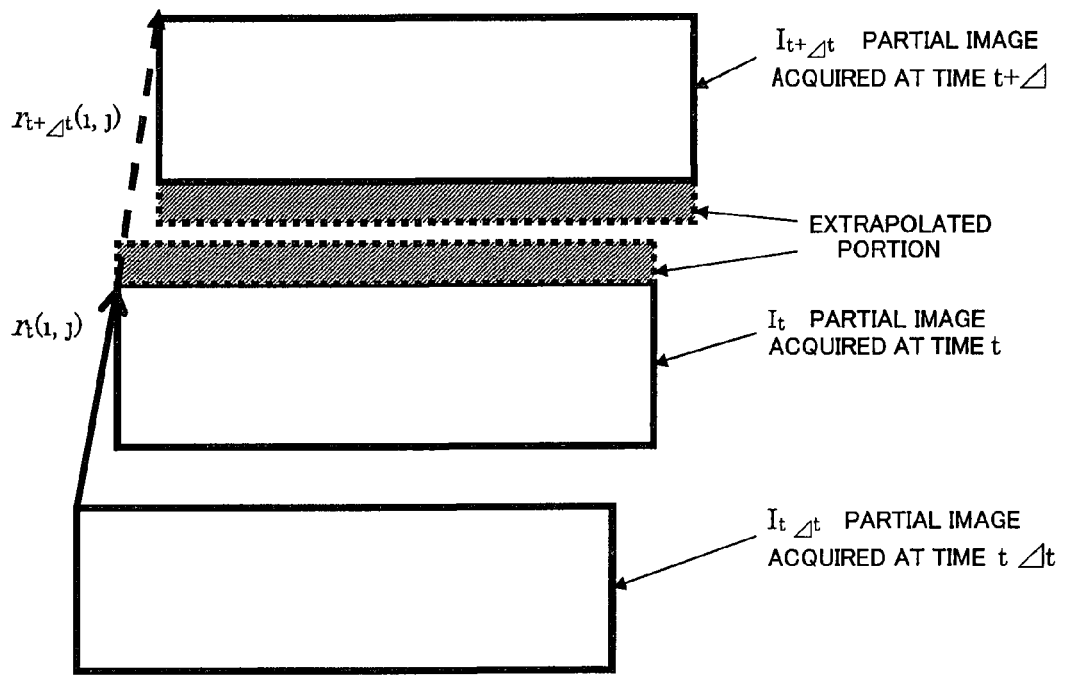
FIG. 17 is a conceptual view depicting an example of the positional relationship between the partial images and extrapolated portions according to the first embodiment.

FIG. 17 is a conceptual view depicting an example of the positional relationship between the partial images and extrapolated portions according to the present embodiment. FIG. 17 illustrates the relative position between the partial image $I_{t-\Delta t}$ sampled at time t−Δt, partial image $I_t$ sampled at time t, and partial image $I_{t+\Delta t}$ sampled at time t+Δt. If the condition that Δt is sufficiently small is satisfied, it is possible to consider that the relative position $r_{t+\Delta t}(i,j)$ calculated from the partial image $I_t$ sampled at time t and partial image $I_{t+\Delta t}$ sampled at time t+Δt does not significantly deviate from the relative position $r_{t(i,j)}$ detected from the partial image $I_{t-\Delta t}$ sampled at time t−Δt and partial image $I_t$ sampled at time t, according to the law of inertia. Thus, when the relative position $r_{t+\Delta t}(i,j)$ is calculated, the side end of the partial image $I_t$ sampled at time t on the same side as $r_t$ is extrapolated and the other end of the partial image $I_t$ need not be extrapolated. For the partial image $I_{t+\Delta t}$ sampled at time t+Δt, the side end thereof on the opposite side to $r_t$ is extrapolated.

Further, the prediction section 2 determines, based on the above-mentioned prediction, whether the extrapolation is necessary or not. When it is determined that the extrapolation is necessary, the prediction section 2 specifies, based on the abovementioned prediction, to the extrapolation section 3 the image extension area including the position to be extrapolated, the size of the portion to be extrapolated, and the number of times of repetition of the extrapolation processing.

The prediction section 2 determines the next portion to be extrapolated based on the relative position of a most recently acquired partial image in the present embodiment. Alternatively, however, the prediction section 2 may determine the next portion to be extrapolated based on the relative positions of a plurality of previously acquired partial images. Further, the prediction section 2 may skip limiting a portion to be extrapolated. In this case, the extrapolation section 3 extrapolates all the peripheral sides of the partial image. Further, the prediction section 2 may skip performing the extrapolation determination processing. In this case, the extrapolation section 3 performs extrapolation for all the partial images.

As described above, the prediction section 2 limits the area of an image detected by the fingerprint sensor 1 that the extrapolation section 3 extrapolates, thereby reducing processing load. Further, the prediction section 2 predicts the relative position of an image to be read next by the fingerprint sensor 1 so as to determine whether the extrapolation is necessary or not. Then, in the case of necessity of the extrapolation, that is, in the case where images do not overlap each other, or where an overlapping portion, if exists, is small in size, the extrapolation section 3 performs the extrapolation, while in the case where images sufficiently overlap each other, the extrapolation is skipped. This configuration prevents an increase in processing time due to high processing load in a device having relatively low CPU performance, such as a mobile phone or a PDA, thereby improving usability.

Next, the reconstruction section 5 will be described.

The reconstruction section 5 arranges a plurality of partial images based on the relative positions among the plurality of partial images to generate one entire image and outputs it as output information. In the case where there exits any gap among the arranged partial images, the reconstruction section 5 performs interpolation among the partial images so as to bridge the gap.

Figure 18:
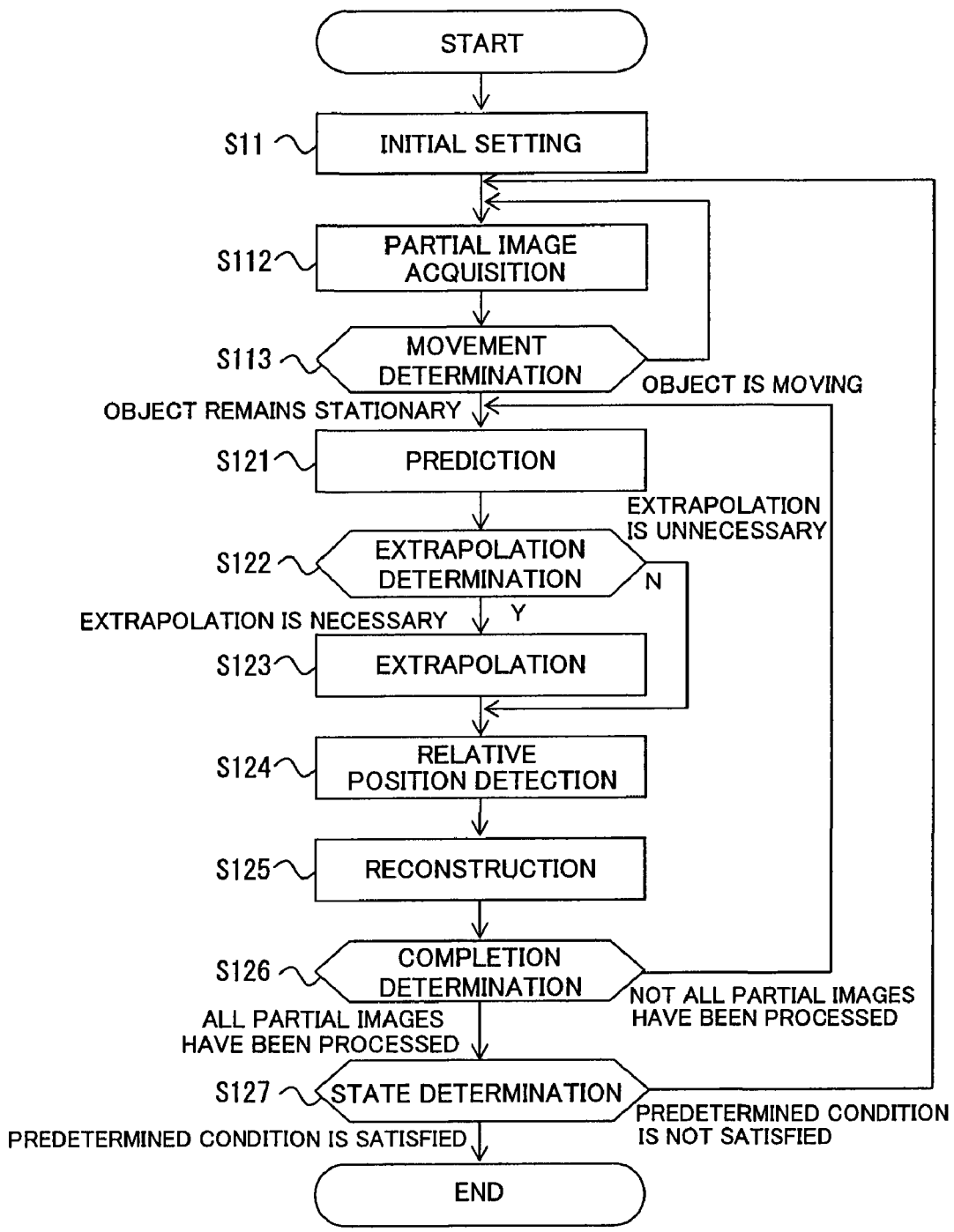
FIG. 18 is a flowchart depicting another example of operation of the fingerprint reading apparatus according to the first embodiment.

Although the fingerprint reading apparatus performs the extrapolation processing or relative position detection processing on a per one partial image basis, the fingerprint reading apparatus may perform the extrapolation processing or relative position detection processing at a time after acquisition of a plurality of partial images. FIG. 18 is a flowchart depicting another example of operation of the fingerprint reading apparatus according to the present embodiment. Step S11 is the same as that of FIG. 2. Then, the fingerprint sensor 1 performs the partial image acquisition processing (S112) and determines whether an object (finger) is moving or not. When it is determined that the object is moving (S113: object is moving), the flow returns to step S112. When it is determined that the object remains stationary (S113: object remains stationary), the flow proceeds to the next step.

Then, based on the relative position of a partial image that has previously been calculated, the prediction section 2 performs prediction of the relative position of a partial image to be acquired next (S121). The prediction section 2 then performs the extrapolation determination processing that determines whether or not to perform extrapolation processing based on the position predicted in the prediction processing (S122). When it is determined to perform the extrapolation processing (Yes in S122), the extrapolation section 3 performs the extrapolation processing based on the partial image (S123) followed by the next step. When it is determined not to perform the extrapolation processing (No in S122), the flow proceeds to the next step. Then, the relative position detection section 4 performs the relative position detection processing that detects the relative positions between the partial images or extended images based on the acquired partial images and extended images (S124).

Then, the reconstruction section 5 performs the reconstruction processing that synthesizes a plurality of partial images based on the relative positions of the partial images so as to generate an output image (S126) and then determines whether all the partial images have been processed (S126). When it is determined that not all the partial images have been processed (S126: not all partial images have been processed), the flow returns to step S121 where the reconstruction section 5 processes the next partial image. When it is determined that all the partial images have been processed (S126: all partial images have been processed), the flow proceeds to the next processing. The reconstruction section 5 determines whether an obtained state (relative position, etc.) satisfies a predetermined condition (S127). When it is determined that the obtained state does not satisfy a predetermined condition (S127: a predetermined condition is not satisfied), the flow returns to step S112. When it is determined that the obtained state satisfies a predetermined condition (S127: a predetermined condition is satisfied), the flow is ended.

According to the above procedure, it is possible to reduce the processing load involved in each time the fingerprint sensor 1 acquires the partial image, thereby reducing the partial image acquisition time interval.

Second Embodiment

In the present embodiment, a case where the present invention is applied to a fingerprint reading apparatus will be described as in the case of the first embodiment. A fingerprint reading apparatus according to the present embodiment is configured to acquire a plurality of partial images of a fingerprint while a finger is moved and output information concerning the partial image and relative position.

Figure 19:
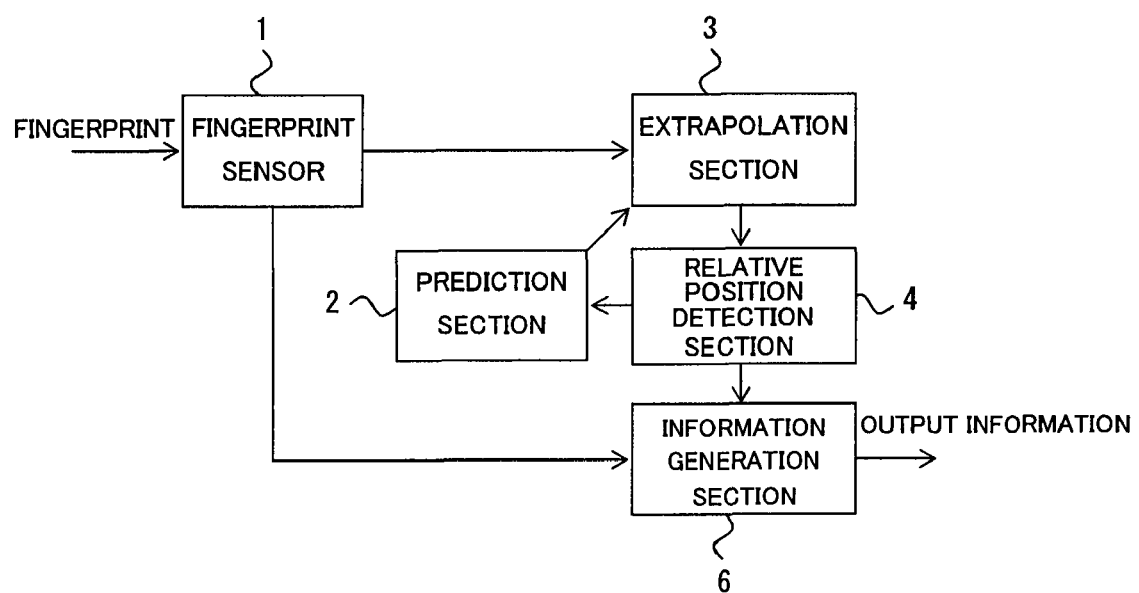
FIG. 19 is a block diagram depicting an example of a configuration of the fingerprint reading apparatus according to a second embodiment.

FIG. 19 is a block diagram depicting an example of a configuration of the fingerprint reading apparatus according to the present embodiment. In FIG. 19, the same reference numerals as those in FIG. 1 denote the same or corresponding parts as those in FIG. 1, and the descriptions thereof will be omitted here. As can be seen by comparing FIG. 19 with FIG. 1, the fingerprint reading apparatus according to the present embodiment includes an information generation section 6 (output section) in place of the reconstruction section 5.

FIG. 20 is a flowchart depicting an example of operation of the fingerprint reading apparatus according to the present embodiment. Processing from steps S11 to S17 is the same as that of FIG. 2. Then, the information generation section 6 determines whether a state obtained based on the relative positions satisfies a predetermined condition (S23). When it is determined that the obtained state does not satisfy a predetermined condition (S23: a predetermined condition is not satisfied), the flow returns to step S12. When it is determined that the obtained state satisfies a predetermined condition (S23: a predetermined condition is satisfied), the information generation section 6 performs information generation processing that generates output information based on the output from the fingerprint sensor 1 and output from the relative position detection section 4 (S24), and this flow is ended.

Next, the information generation section 6 will be described.

The output information generated by the information generation section 6 is represented by an array of elements including the relative position, partial image, and the like. FIG. 21 is a table depicting an example of a format of the output information according to the present embodiment. The output information includes partial image information corresponding to a header section and a partial image. The header section represents the attribute of the entire output information. The 1st to N-th partial information that have been acquired by the fingerprint sensor 1 and additional information thereof are sequentially listed.

FIG. 22 is a table depicting an example of a format of the header section in the output information according to the present embodiment. The header section includes device type, image type, resolution of image, quantization level of image, number of pieces of image information, vertical size of image, and horizontal size of image. The device type is an ID or character string representing a device type of the fingerprint sensor 1. The image type is an ID or character string representing a method by which a device reads organism information. The resolution is a numerical value representing the resolution of a device. As a unit of resolution, dpi (dot-per-inch) or ppcm (pixel-per-centimeter) is generally used. The quantization level is also referred to as gradation level, a unit of which is bit (or absolute number). The number of pieces of image information is the total number of the partial images following the header section. Although not represented in this example, the header section may store information for identifying a unit of a numerical value of each item as an attribute value.

FIG. 23 is a table depicting an example of a format of the partial image information in the output information according to the present embodiment. The partial image information includes vertical movement amount, horizontal movement amount, time stamp 1, time stamp 2, sensitivity setting of fingerprint sensor 1, presence/absence of extrapolation, and partial image. The vertical movement amount is the relative position of a target partial image with respect to a most recently acquired partial image and represents a vertical direction component thereof. Similarly, vertical movement amount represents a horizontal direction component of the relative position of a target partial image with respect to a most recently acquired partial image. The time stamps 1 and 2 represent read start time and read end time, respectively. If relative read start time and read end time with respect to the read start time of the 1st partial image can be obtained, the read start time and read end time need not be represented by clock time. For example, the time stamp 1 may be a difference from the read start time of a most recently acquired partial image. Further, the time stamp 2 may be a difference from the read start time. The time stamps 1 and 2 are used for correction of the distortion of the partial image caused due to a reading time difference between pixels within the partial image.

When the information generation section 6 outputs the partial image and relative position to an external information processor, the information processor can reconstruct the partial image. Further, when the information generation section 6 outputs the vertical movement amount and horizontal movement amount to an external information processor, the fingerprint reading apparatus can be used as a pointing device of the information processor. Note that the information generation section 6 may output only information of the relative position such as the vertical movement amount or horizontal movement amount.

As described above, the information generation section 6 can output, together with the relative position detected by the relative position detection section 4, the skeleton line information or thin line information acquired by the extrapolation section 3 together with or in place of the partial image, thereby reducing the amount of calculation for extracting the skeleton line information or thin line information from an image in an authentication apparatus that performs personal authentication using the output information from the fingerprint reading apparatus. Alternatively, when the authentication apparatus directly utilizes the skeleton line information or thin line information which is the output information from the fingerprint reading apparatus, it is possible to skip additional detection processing of the skeleton line information or thin line information. Thus, it is possible to reduce the time required for detection processing of the skeleton line information or thin line information which involves a large amount of calculation or skip the detection processing thereof in a device having relatively low CPU performance, such as a mobile phone or a PDA, thereby improving usability.

The information generation section 6 may generate the output information for each partial information without performing the determination processing of step S23, and the fingerprint reading apparatus may repeat steps S12 to S17 and step S24. With this configuration, the fingerprint reading apparatus can output information of the relative position in a continuous manner in the case where the fingerprint reading apparatus is used as a pointing device.

The information generation section 6 may output, in place of the partial image, information of the skeleton line detected in the extrapolation processing as the skeleton line information. In this case, the information generation section 6 may include, in the header section of the output information, an identifier identifying the information of the skeleton line. Further, the information generation section 6 may output the skeleton line information as a tree structure. The tree structure is a data format represented by node points and lines. For example, in the case of a fingerprint, a node point corresponds to an end point, a bifurcation, or an inflection point of the skeleton line. In this case, it can be defined that the end point has only one line, the bifurcation has three lines, and the inflection point has two lines. The node point has, as an attribute, coordinates with the origin of the partial image set as a reference point. Further, the information generation section 6 may include, as an attribute, the number of lines connected to the node point and identification numbers uniquely identifying the lines in the output information. Further, the information generation section 6 may add to the node point, as an attribute, an identification number uniquely determined within the area of the partial image. The line has direction as an attribute. The information generation section 6 may add to the line, as an attribute, identification numbers identifying the node points connected to both ends of the line. The skeleton line extends outside the area of the partial image at the periphery of the partial image. In this case, the point (points) at which the skeleton line and the side (or sides) of the partial image cross each other is (are) regarded as the node point (node points).

Although an object (finger) moves with respect to the fixed acquisition section (fingerprint sensor 1) in the present embodiment, the acquisition section may move with respect to the fixed object, or both the object and acquisition section may relatively move.

The present invention is not limited to the abovementioned embodiments, and various modifications may be made without departing from the scope of the present invention. Although a finger is used as the object to sample a fingerprint image in the above embodiments, the present invention is not limited to this, but the finger may be used to sample a vein pattern image, or a palm may be used as the object to sample a palm pattern or vein pattern image. Also in this case, the same effects as the above embodiments can be obtained. For example, in the case of a vein pattern, a portion corresponding to the ridge line of a fingerprint in the description of the above embodiments may be substituted by a vein portion, and a portion corresponding to the background or valley line may be substituted by a non-vein portion.

The image reading apparatus according to the embodiments of the present invention can easily be applied to an information processor and whereby the performance thereof can be enhanced. An example of the information processor includes, e.g., a PC (personal Computer), a PDA, and a mobile phone.

Further, it is possible to provide a program that allows a computer constituting the image reading apparatus to execute the above steps as a image reading program. By storing the above program in a computer-readable storage medium, it is possible to allow the computer constituting the image reading apparatus to execute the program. The computer-readable medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof; and a transmission medium on a network line.

As described above, according to the embodiments, a positional relationship between the partial images can be detected even when there is no overlapping area between the partial images.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processor having a CPU comprising:
   an fingerprint sensor that acquires a plurality of first images obtained by successively reading portions of a relatively moving object;
   an extrapolation section, executed by the CPU, that extrapolates the plurality of first images to generate a plurality of second images obtained by extending the image areas of the plurality of first images;
   a calculation section, executed by the CPU that, based on a plurality of images including the first images, the second images or a combination of the first images and the second images, calculates the relative positions between two images among the plurality of images; and
   an instruction section, executed by the CPU, that issues to the extrapolation section, based on the relative position of a previous first image calculated by the calculation section, an instruction concerning the extrapolation for a first image whose relative position has not been calculated by the calculation section,
   wherein the instruction section predicts, based on the relative position of the previous first image, the direction of the relative movement at the acquisition time of the first image whose relative position has not been calculated, determines an extrapolation position for the first image whose relative position has not been calculated based on the predicted direction of the relative movement, and notifies the extrapolation section of the determined extrapolation position, and
   wherein when there exists a third image and fourth image, which are the first images successively acquired by the fingerprint sensor, the instruction section sets an extrapolated portion for the third image in the direction toward the fourth image and sets an extrapolated portion for the fourth image in the direction toward the third image.

2. The information processor according to claim 1, wherein the instruction section predicts the relative position of the first image whose relative position has not been calculated based on the relative position of the previous first image or a previous second image corresponding to the previous first image and, when determining based on the prediction that the extrapolation for the first image whose relative position has not been calculated is necessary, instructs the extrapolation section to extrapolate the first image whose relative position has not been calculated.

3. The information processor according to claim 2, wherein the instruction section determines that the extrapolation for the first image whose relative position has not been calculated is necessary when the previous first image or the previous second image corresponding to the previous first image whose relative position has been calculated by the calculation section and the first image whose relative position has not been calculated and whose relative position has been predicted do not overlap each other, or when the overlapping portion therebetween, if exists, is smaller than a predetermined size.

4. The information processor according to claim 3, wherein the instruction section specifies, based on the relative position of the previous first image or the previous second image calculated by the calculation section and the predicted relative position of the first image whose relative position has not been calculated, to the extrapolation section an image extension area concerning the extrapolation for the first image whose relative position has not been calculated.

5. The information processor according to claim 1, wherein the extrapolation section extrapolates a second image to enlarge the size of the second image.

6. The information processor according to claim 1, wherein the object is an organism portion, and
the extrapolation section extrapolates the plurality of first images based on a characteristic of the organism portion.

7. The information processor according to claim 6, wherein the characteristic is any of the continuity of an edge in the first image, continuity of a skeleton line in the first image, and continuity of a frequency region of the first image.

8. The information processor according to claim 1, further comprising an output section, executed by the CPU, that outputs any of the plurality of first images and relative positions of the plurality of first images.

9. The information processor according to claim 1, further comprising a synthesis section, executed by the CPU, that synthesizes the plurality of first images based on the plurality of first images and relative positions thereof to generate one image.

10. An image reading method comprising:
acquiring a plurality of first images obtained by successively reading portions of a relatively moving object;
extrapolating the plurality of first images to generate a plurality of second images obtained by extending the image areas of the plurality of first images;
calculating, based on a plurality of images including the first images, the second images or combination of the first images and the second images, the relative positions between two images among the plurality of images; and
allowing a computer to perform executing of issuing, based on the relative position of a previous first image calculated by the calculating, an instruction concerning the extrapolation for a first image whose relative position has not been calculated by the calculating to perform the extrapolating and the calculating, wherein the executing of the issuing of the instruction predicts, based on the relative position of the previous first image, the direction of the relative movement at the acquisition time of the first image whose relative position has not been calculated, determines an extrapolation position for the first image whose relative position has not been calculated based on the predicted direction of the relative movement, and notifies the extrapolating of the determined extrapolation position, and wherein when there exists a third image and fourth image, which are the first images successively acquired in the acquiring, the executing of the instruction sets an extrapolated portion for the third image in the direction toward the fourth image and sets an extrapolated portion for the fourth image in the direction toward the third image.

11. The image reading method according to claim 10, wherein
the executing of the issuing of the instruction predicts the relative position of the first image whose relative position has not been calculated based on the relative position of the previous first image and, when determining based on the prediction that the extrapolation for the first image whose relative position has not been calculated is necessary, instructs the extrapolating to extrapolate the first image whose relative position has not been calculated.

12. The image reading method according to claim 10, wherein
the object is an organism portion, and
the extrapolating extrapolates the plurality of first images based on a characteristic of the organism portion.

13. The image reading method according to claim 12, wherein
the characteristic is any of the continuity of an edge in the first image, continuity of a skeleton line in the first image, and continuity of a frequency region of the first image.

* * * * *